United States Patent [19]

Cambridge et al.

[11] Patent Number: 4,465,659

[45] Date of Patent: Aug. 14, 1984

[54] ALUMINUM PRODUCTION VIA THE CHLORINATION OF PARTIALLY CALCINED ALUMINUM CHLORIDE HEXAHYDRATE

[75] Inventors: Edward L. Cambridge; Raouf O. Loutfy; James C. Withers, all of Tucson, Ariz.

[73] Assignee: Atlantic Richfield Company, Los Angeles, Calif.

[21] Appl. No.: 400,310

[22] Filed: Jul. 21, 1982

[51] Int. Cl.³ .......................... C01F 7/60; C25C 3/06
[52] U.S. Cl. ................................. 423/495; 423/126; 423/132; 423/137; 423/496; 204/67
[58] Field of Search ................ 423/126, 132, 135–137, 423/495, 496; 204/67

[56] References Cited

U.S. PATENT DOCUMENTS

| | | | |
|---|---|---|---|
| 3,755,099 | 8/1973 | Haupin | 204/64 R |
| 3,842,163 | 10/1974 | Russell et al. | 423/496 |
| 4,039,648 | 8/1977 | Haupin et al. | 423/496 |
| 4,105,752 | 8/1978 | Becker et al. | 423/496 |
| 4,110,399 | 8/1978 | Gaudernack et al. | 423/126 |
| 4,135,994 | 1/1979 | Ishikawa et al. | 204/67 |
| 4,151,061 | 4/1979 | Ishikawa et al. | 204/247 |
| 4,235,860 | 11/1980 | Wohleber et al. | 423/495 |
| 4,264,569 | 4/1981 | Sinha | 423/495 |
| 4,284,607 | 8/1981 | Culleiton et al. | 423/137 |

FOREIGN PATENT DOCUMENTS 760206 1/1976 France.
40525A/23 4/1977 German Democratic Rep..

OTHER PUBLICATIONS

A. Landsberg, "Some Factors Affecting the Chlorination of Kaolinic Clay", Met. Trans. B. AIME 8B, Sep. 1977, p. 435.

Alder et al., "The Chlorination of Alumina: A Comparison of the Kinetics with Different Reduction Agents", Light Metal, 1979, p. 337.

K. B. Bengtson, "A Technology Comparison of Six Processes for the Production of Reduction–Grade Alumina from Non–Bauxitic Raw Material", Light Metal, Feb. 1979, p. 217 and references therein.

Landsberg, "Chlorination Kinetics of Aluminum Bearing Materials", Met. Trans. B. AIME 6B, Jun. 1975, p. 207.

D. Petzold, et al., "Thermoanalytical Examinations for the Formation of Crystalline $Al_2O_3$–Forms in the Thermal Decomposition of Aluminum Chloride Hexahydrate", Mining College Freiberg, Apr. 1980, Chemistry Section.

Primary Examiner—Earl C. Thomas

[57] ABSTRACT

An improved method of producing anhydrous aluminum chloride via aluminum chloride hexahydrate is provided. In a preferred embodiment the method is incorporated into a process for producing aluminum from aluminous ores, and particularly from domestic ore sources comprising (1) acid leaching an aluminous ore to produce aluminum chloride hexahydrate (ACH); (2) calcining the ACH to a specific temperature of above about 450° C. to produce highly reactive aluminous particles containing high residual chloride and low residual hydrogen levels; (3) reductively chlorinating the calcined ACH at a low temperature to produce anhydrous aluminum chloride suitable for electrolytic reduction; and (4) electrolytically reducing the anhydrous aluminum chloride in a fused salt to produce aluminum metal and chlorine which is recycled to step (3).

29 Claims, 1 Drawing Figure

ALUMINUM PRODUCTION VIA THE CHLORINATION OF PARTIALLY CALCINED ALUMINUM CHLORIDE HEXAHYDRATE

BACKGROUND OF THE INVENTION

1. Field of the Invention

This invention relates to the production of aluminum metal from aluminous raw materials via aluminum chloride hexahydrate (ACH) and in particular to an improved process for treating ACH prior to its reductive chlorination to anhydrous aluminum chloride suitable for electrolytic reduction to aluminum.

2. Description of the Prior Art

The Bayer-Hall-Heroult process has been used for the reduction of bauxitic ore to aluminum metal for about 90 years. It is the only commercial process for producing aluminum metal and is very energy intensive. The overall process from the mining of ore to the electrolytic reduction of alumina to aluminum metal consumes about $200 \times 10^6$ BTU/ton of aluminum which is only about 10% energy efficient.

Bauxite ore which predominantly occurs within the equatorial regions, is mined, dried and finely ground before being fed to the Bayer step. The Bayer step, which is applicable to bauxitic ores only, involves a hot, high-pressure caustic (NaOH) leach which dissolves the aluminum content as sodium aluminate ($NaAlO_2$). Other impurities such as hematite ($Fe_2O_3$), titania ($TiO_2$) and silica ($SiO_2$) are insoluble and are separated from the pregnant leach liquor by thickening and filtration. Alumina trihydrate ($Al_2O_3.3H_2O$) is precipitated from the sodium aluminate by seeding with trihydrate crystals and by cooling and dilution. The precipitated trihydrate is washed to remove most of the caustic and then calcined to over 1100° C. to produce $Al_2O_3$ low in hydrogen as a feed to the aluminum smelter. The alumina is dissolved in molten cryolite at about 960° C. and electrolyzed with carbon anodes to produce aluminum metal and primarily $CO_2$ off gas. The electrolysis step requires, typically, about 7.5 kwh/lb (78,750 BTU/lb) with the most modern cells operating at about 6 kwh/lb (63,000 BTU/lb). If the most modern, energy efficient mining, drying, and Bayer processing is combined with the best smelting operation, the total energy consumption would be about 175 MBTU/ton. Since more than two thirds of the energy consumption is in the electrolytic step, efforts have been directed to reducing this energy intensive step. It is known that anhydrous aluminum chloride can be electrolytically reduced at low temperatures of about 700° to 750° C. to produce aluminum and chloride at less than 4 kwh/lb (42,000 BTU/lb) or a reduction of 35 to 45 percent compared to Hall technology. However, the energy to produce anhydrous aluminum chloride must be subtracted from the energy savings to achieve the net energy savings.

Many processes have been proposed to economically produce anhydrous aluminum chloride in order to take advantage of the energy savings that can be accomplished through the electrolysis of $AlCl_3$. A prerequisite of the $AlCl_3$ feed is that it must be essentially free of moisture. This results in the requirement that production of the very moisture sensitive $AlCl_3$ be on site with the electrolytic cells to prevent moisture pick-up in transit.

The processes proposed to produce anhydrous $AlCl_3$ include the direct chlorination of ores, fly ash and purified Bayer alumina. In the chlorination of ores or fly ash, the metallic impurities such as iron, titanium, silicon, sodium, and the like are also chlorinated and must be separated from the $AlCl_3$ for it to be a satisfactory feed to the electrolytic cell. Unfortunately, satisfactory separation processes are not available. If it were possible to separate the chloride components, the impurity chlorides would require additional processing to recover the valuable chlorine component for recycle chlorination. Additionally, if it were possible to directly chlorinate an ore, it would be necessary to locate the smelter at the mine since the anhydrous $AlCl_3$ cannot be successfully transported. Usually, favorable electrical rates required for smelters are not available at mine sites. Consequently, the most successful chlorination process known utilizes the purified product Bayer alumina, the same feed as used in the Hall cell.

Bayer alumina typically contains about 0.5% sodium as $Na_2O$ that arises from the alkali liquor when the sodium aluminate is precipitated as trihydrate. The sodium content does not adversely affect the Hall cell electrolysis since the electrolytic bath contains sodium as NaF in cryolite. However, when Bayer alumina is reductively chlorinated, the sodium also chlorinates forming $NaAlCl_4$, which has a melting point of approximately 150° C. This low melting compound results in a liquid in an otherwise gaseous system and causes extensive corrosive damage at the typical alumina chlorination temperatures of 700° to 1000° C. Also, valuable chlorine is used. Thus, in any economically viable process the $NaAlCl_4$ must be separated and oxidized to release the chlorine for recycle, followed by disposal of $NaAlO_2$.

The typically high calcination temperatures used (1000° to 1280° C.) to produce Bayer alumina for Hall cell feed result in particles with comparatively low activity with respect to reductive chlorination. Consequently, high chlorination temperatures are required to achieve reasonable chlorination rates. The chlorination temperature for Bayer alumina with solid reductant will be above 700° C. and typically is 800° to 1000° C. (A. Landsberg, "Some Factors Affecting the Chlorination of Kaolinic Clay", Met. Trans. B. AIME 8B, September 1977, p. 435). Thus, a high degree of capital sensitivity results due to the need for high temperatures and the corrosion problem related to the $NaAlCl_4$ present. Also, more carbon is required in the reaction because at high temperatures more CO is produced. For example, at or below 700° C., the molar carbon to aluminum ratio approaches 0.75 and typically corresponds to 0.33 lb C/lb Al, whereas at 900° C. the molar ratio of carbon to aluminum approaches 1.5 and typically corresponds to carbon consumption of 0.67 lb C/lb Al (Alder et al., "The Chlorination of Alumina: A Comparison of the Kinetics With Different Reduction Agents", Light Metal, 1979, p. 337). The reaction rate at 700° C. is too slow to be practical and at 900° C. and above the carbon cost is prohibitive.

U.S. Pat. No. 4,264,569 teaches a process for producing anhydrous aluminum chloride for use in electrolytic cells wherein the ACH is heated at a temperature range of 200°–450° C. until it is substantially dehydrated and thereafter reacting the dehydrated material in the presence of a gas mixture of chlorine, carbon monoxide, carbon dioxide and hydrogen to produce gaseous anhydrous aluminum chloride. Even though this approach overcomes many of the problems associated with the high temperature chlorination of alumina, it was not recognized that calcining ACH within the temperature range specified in the prior art has the disadvantage of producing a material with a high concentration of residual hydrogen. This residual hydrogen in the ACH results in the unproductive consumption of valuable chlorine and makes the process of producing anhydrous aluminum chloride uneconomical.

DETAILED DESCRIPTION OF PREFERRED EMBODIMENT

Figure 1:
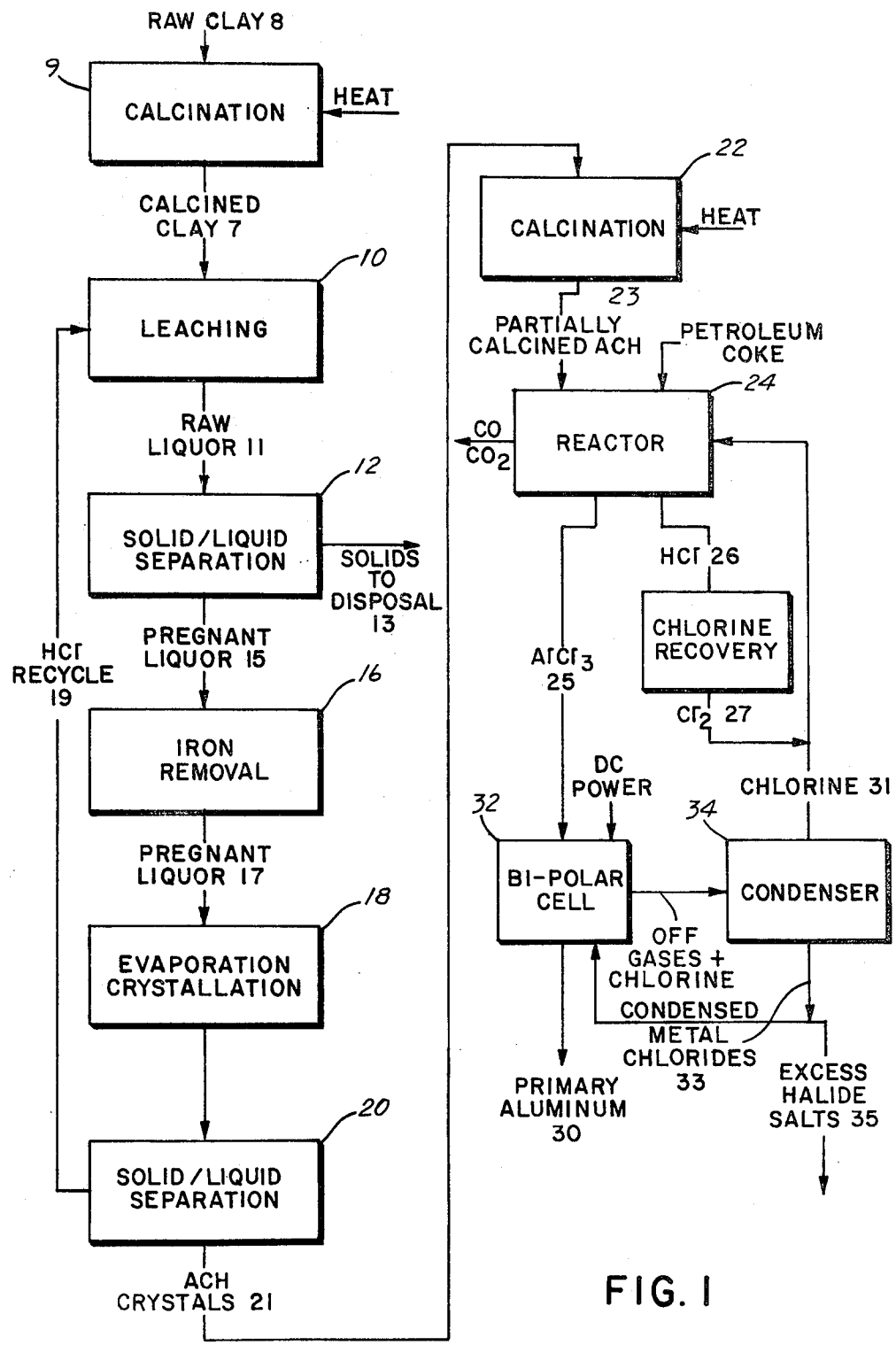
FIG. 1 is a flow diagram of the process of the preferred embodiment.

Referring now to FIG. 1, clay or other aluminous material undergoes acid leaching to dissolve the alumina containing fraction from the inert fraction of the material 10. Any aluminous ore or material may be used; however, clays or fly ash are preferred sources. The traditional bauxite can be used but is not preferred because most bauxites contain a considerable iron fraction which is difficult to separate from an acid leach. It is possible, however, to caustic leach bauxite by methods known in the art and then treat the washed alumina trihydrate formed with HCl to form $AlCl_3 \cdot 6H_2O$, i.e., aluminum chloride hexahydrate (ACH), which is then calcined according to the present invention to form anhydrous $AlCl_3$ useful for production of aluminum by electrolytic reduction. The preferred ore is a kaolinite, such as domestic kaolin clay. Any clay may be acid leached with nitric acid, sulfuric acid or hydrochloric acid. (K. B. Bengtson, "A Technology Comparison of Six Processes for the Production of Reduction-Grade Alumina From Non-Bauxitic Raw Material", Light Metal, Feb. 1979, p. 217, and references therein). If nitric or sulfuric acid is used for the leach, a subsequent step must convert to hydrochloric acid to form aluminum chloride hexahydrate (ACH). Methods of leaching with one acid and then converting to HCl are well known. (J. Cohen et al, French Patent Application No. 76,0206 by Aluminum Pechiney, Jan. 20, 1976). In the preferred mode described hereafter HCl is used to initially digest the clay ore.

Preferably prior to the leaching 10, the clay undergoes calcination 9 to activate the clay so that it will leach in a minimum of time. The clay will leach even if not calcined, but at a much slower rate.

Clay from the mine may be dried if necessary to render it amenable to materials handling and particle size control following which, in a continuous operation, it is typically sent to covered storage. Clay 8 withdrawn from storage is crushed/agglomerated as necessary. It next goes to calcination 9, which may be direct-fired with any conventional fuel including powdered coal.

The rate of solution of clay in all acids is very greatly increased by calcination of the clay for 0.1 to about 2 hrs in the temperature range 1200° to 1500° F. The required residence time in calcination 9 is therefore largely determined by the size of particles calcined and by the rate of heat transfer to individual particles. Calcination also removes free and combined water and destroys any organic materials which may be present in the clay as mined.

Typical mined clay has approximately the following analysis:

| | |
|---|---|
| Moisture | 22.0% |
| Total $Al_2O_3$ | 35.0% (dry basis) |
| Available $Al_2O_3$ | 32.2% |
| Total $Fe_2O_3$ | 1.15% (dry basis) |
| Available $Fe_2O_3$ | 1.08% |
| Loss on Ignition | 11.75% (dry basis) |

Clay fed to a grate-kiln system is preheated and dried. Following preheating, the dried clay flakes are calcined in the coal-fired kiln section for two hours. The hot calcine is cooled in a moving grate cooler which produces solids at a discharge temperature of about 85° F. for transfer to the leach tanks.

Alternatively, a coal-fired fluid-bed reactor could be used for calcining clay. Wet clay is reduced from $-12$ inch to $-2$ inch material in double roll cutters for storage. The material is conveyed to a non-clog hammer mill where the size is reduced to $-\frac{3}{4}$ inch. The product is dried to about 10 to 15 percent moisture in a rotary drier by off-gases from calcination in order to dry grind. This partially dried clay is further reduced to $-20$ mesh by dry grinding in an open-circuit rod mill or a cage mill, and then stored.

The calcination 9 of the clay may be effected in a three-stage, fluidized bed reactor using pulverized coal. The top bed operates at 250° F. and it receives and completely dries the clay. Supplemental heat can be added to this bed to assure that drying temperatures are maintained. Dried clay is calcined (at approximately 1200° F.) with coal combustion in the middle bed of the unit for about an hour. Heat recovery is accomplished by cooling the clay in the third (bottom) bed with incoming combustion air. The clay leaves the calciner unit at approximately 900° F. and cooled to 150° F., by utilizing off-gases from the clay driers.

The leaching step 10 dissolves the soluble alumina fraction from the inert fraction of the calcined clay using hydrochloric acid. Because some impurities are also dissolved this operation produces an impure solution or raw liquid 11 of aluminum chloride and other chlorides, iron being the most important impurity, in a slurry with the insoluble residue. The principal chemical reactions taking place during leaching are:

$$(Al_2O_3 + 2SiO_2) + 6HCl \rightarrow 2AlCl_3 + 3H_2O + 2SiO_2$$

$$Fe_2O_3 + 6HCl \rightarrow 2FeCl_3 + 3H_2O$$

$$FeO + 2HCl \rightarrow FeCl_2 + H_2O$$

Calcined clay 7 from storage is metered continuously, e.g., through a weighing-screw conveyor, into the first-stage leach tanks. Hydrochloric acid of about 10 to about 26 weight percent, preferably from about 20 to about 26 weight percent, concentration is simultaneously metered into the leach tanks. Typically, a 10 gram per liter excess of HCl is maintained in the leach liquor 11 leaving the final leach tank. Provision is made by means of a graphite heat exchanger to heat the entering acid to 140° F. when necessary. Optionally, this acid may be heated indirectly with steam, or with 225° F. slurry discharging from the leach tanks. Each leaching train consists of mechanically agitated vessels with agitation sufficient to keep solids suspended. The leach slurry flows from tank to tank continuously in each train. The total residence time is about three hours, during which time an extraction of about 92 percent is obtained. Although the above described leach process is a continuous process, the leaching can likewise be effected as a batch process.

The raw liquor 11, typically a boiling slurry at about 225° F., leaves the final leach tanks and goes to a two-stage vacuum flash cooling unit. The leach slurry then undergoes a solid/liquid separation 12 to remove all solids 13 from the solution of aluminum chloride before further processing. The cooled leach slurry discharged from the flash coolers is typically mixed with a flocculent and sent to one or more thickeners operating at about 115° F. The overflow from the last thickener passes to the first of two sets of filter presses, operated in series, for final liquor clarification. The second-stage filter presses provide insurance against unclear liquor from the first stage because of poor operation. The filtrate or pregnant liquor 15 has the following typical analysis results:

| Component | Percent by Weight |
|---|---|
| $AlCl_3$ | 17.73 |
| $FeCl_3$ | 0.46 |
| $CaCl_2$ | 0.06 |
| $MgCl_2$ | 0.06 |
| Others | 0.11 |
| HCl | 0.85 |
| $H_2O$ | 80.73 |

Although the iron content in the above analysis is recorded in the ferric form, about 24 percent of it exists in the ferrous form. The underflow from the last thickener, at 30 percent solids, is pumped to rotary filters. The filter coolers, together with these obtained from liquor clarification are sent to tailing.

The removal of iron at this point is desirable to ensure that it does not enter crystallization, thereby ensuring its exclusion from the final product. The first step in iron removal 16 is quantitative oxidation of the iron to the ferric state in order to render it amenable to solvent extraction accomplished by means of elemental chlorine, which oxidizes ferrous iron very quickly according to the reaction

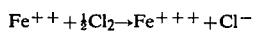

$$Fe^{++} + \tfrac{1}{2}Cl_2 \rightarrow Fe^{+++} + Cl^-$$

Chlorine is injected into the pipeline carrying the pregnant liquor from the last-clarification filter press to the rubber-lined chlorinated pregnant solution tank. An organic, liquid-ion-exchange solvent is employed to extract the iron from the pregnant liquor in three stages of counter-current mixer/settling equipment. The iron content of the pregnant liquor stream is reduced from 0.46 percent by weight to 34.5 parts per million. The contact time required is a few seconds. The organic liquid ion exchange is comprised of a mixture of decyl alcohol, kerosene, and a secondary or tertiary high-molecular-weight amine which is responsible for iron stripping. Volume proportions of make-up solvent are 2 percent amine, 9 percent decyl alcohol, and 89 percent kerosene. This mixture is treated with 20 percent hydrochloric acid to convert the amine into the amine-chloride form required for solvent extraction. In a continuous operation the substantially iron-free liquor is pumped to a storage tank which supplies the crystallization section 18. Iron-loaded organic solvent may be treated to regenerate the solvent.

After the leach liquor is separated from the residue and processed in a solvent extraction step to extract the iron component, the resultant pregnant liquor 17 typically contains about 25 to about 35 percent aluminum chloride hexahydrate (ACH). Two methods of obtaining substantially iron-free crystals of ACH which may be used are evaporation or HCl gas sparging. In the case of evaporated crystallization, the aluminum chloride level in the iron-free pregnant liquor is concentrated by evaporation using a recirculating heat exchanger and vacuum flash system. The evaporator increases the aluminum chloride concentration from about 18.7 to about 29.0 percent by weight. This saturated stream enters the crystallizer where this stream flashes down to 192° F. Crystals of aluminum chloride hexahydrate (ACH) are formed in the crystallizer. In continuous operation of the crystallizer, the crystal concentration at the bottom is maintained at 33 percent by volume using a standard settling test. Operation in this manner produces good quality crystals in the 10–20 mesh size range.

The ACH crystals may be separated from the crystallizer mother liquor in separation section 20 by either vacuum filtration or centrifuges. The crystals are thereafter washed with 35% hydrochloric acid, in which aluminum chloride has a very low solubility, to free them of adhering mother liquor. Mother liquor from centrifugation is split and a portion returned to the crystallizer feed tank. The remainder of the liquor is sent to a purge crystallizer which operates to control impurity levels in the system 19.

In a more preferred embodiment, crystallization is effected by a gas-induced (sparging) technique which utilizes the common ion effect to reduce the solubility of ACH in the process liquor. Iron-free process liquor is evaporated to near saturation by using a recirculating heat exchanger and vacuum flash system similar to that used for evaporative crystallization. The evaporation increases the aluminum chloride concentration from about 18.7 to about 31 percent by weight.

Concentrated aluminum chloride liquor and hydrogen chloride gas are introduced into the circulating loops of crystallizer (operating at 160° F.), to produce hydrochloric acid solutions supersaturated with ACH. The circulating liquors enter the bottom of the crystallizer magma chambers from the downcomer tubes and then flow upward through the fluidized crystal beds. Supersaturation of the solutions is relieved by both growth of ACH on the surface of existing crystals and the formulation of new nuclei.

Starting with a saturated aluminum chloride solution, ACH is crystallized as hydrogen chloride dissolves so as to maintain a virtually constant molality in the solution with respect to chloride until the aluminum chloride solubility is depressed to approximately 6.5 percent in the presence of 25.6 percent HCl. The solubility of aluminum chloride may be further depressed to 0.7 percent at 35.5 percent HCl. The rate of HCl addition is controlled to constantly produce only the desired degree of supersaturation in the recirculation liquors.

Crystal slurry from each crystallization stage is pumped to centrifugal separators and washed. Washed crystals are sent to partial calcination section 22 for conversion to activated alumina. Clarified mother liquor containing HCl from crystallization may be recycled to clay leaching. The remaining portion of the mother liquor stream may be shipped to bleed treatment where additional ACH crystals are recovered and returned to the evaporator feed liquor.

A major purpose of aluminum chloride hexahydrate (ACH) crystallization is to separate aluminum from acid-soluble impurities. However, even though ACH tends to crystallize as a pure component, other elements in solution, such as phosphorous and magnesium, may precipitate or co-crystallize to some degree and thus appear in the ACH. The presence of magnesium and phosphorous in the resultant product is not deleterious to the practice of the present invention. It should be noted, however, that where this acid-leach process has been utilized to prepare alumina as a feed material for Hall cell electrolytic production of aluminum, such impurities are unacceptable and result in the need for a second crystallization step unnecessary for practice of this invention.

Heretofore the end objective of clay acid leach processing was to produce alumina for Hall cell feed. Consequently, in the past, to achieve high purity alumina, the crystallized ACH was reprocessed to obtain a high purity product. The initial or single stage crystallized ACH was washed and the liquor returned to the ore leach step. The washed ACH crystals were then redissolved in a pure HCl liquor and then recrystallized as before. The purified ACH by recrystallization was then dried and calcined to about 1000° to 1280° C. to produce alumina for Hall cell feed and the HCl gas evolved from calcining the $AlCl_3.6H_2O$ was typically collected in the spent liquor for leaching of more ore. A typical concentration level of impurities in single stage and recrystallized ACH is shown in Table A along with Bayer alumina for comparison.

TABLE A

Typical Impurity Concentration in ACH From Single Stage and Double Stage Crystallization VS Bayer Alumina Cell Feed

| Impurities | Single Stage ACH* | Concentration in Wt % Recrystallized ACH* | Bayer $Al_2O_3$ |
|---|---|---|---|
| $P_2O_5$ | .024 | .0009 | .001 |
| MgO | .013 | .0009 | .002 |
| $Cr_2O_3$ | .004 | .00024 | .002 |
| MnO | .0014 | .0009 | .002 |
| $V_2O_5$ | .0005 | .0005 | .002 |
| $TiO_2$ | .0005 | .0005 | .005 |
| $K_2O$ | .0038 | .0009 | .005 |
| NiO | .005 | .005 | .005 |
| CuO | .0014 | .0014 | .01 |
| $Fe_2O_3$ | .013 | .018 | .015 |
| $SiO_2$ | .004 | .002 | .015 |
| ZnO | .0009 | .0015 | .02 |
| CaO | .004 | .004 | .04 |
| $Na_2O$ | .0028 | .0014 | .4 |

*Impurity concentrations in ACH are reported on the basis of weight percent in $Al_2O_3$.

From Table A it can be seen that calcining single stage crystallized ACH will produce alumina with higher amounts of $P_2O_5$, MgO and $Cr_2O_3$ than are present in Bayer alumina, making the product unacceptable as feed material for the Hall cell. This is primarily due to the high amount of $P_2O_5$, since it is well established that the current efficiency of the aluminum electrolysis in Hall cell diminishes by about 1% for every 0.01% phosphorous concentration in the electrolyte. Calcined recrystallized ACH produces acceptable alumina as a feed for Hall cell but at the added capital and energy cost of the recrystallizer. It has been found that single stage crystallized ACH can be used as a feed material to produce anhydrous $AlCl_3$ according to the present invention with no deleterious effect of phosphorous when used for electrolysis.

Calcination 22 in the practice of the present invention is at temperatures above 450° C., preferably below about 1000° C., more preferably at temperatures between about 500° C. to about 800° C., and most preferably at temperatures between about 600° C. to about 750° C., for a time period sufficient to partially calcine, i.e., substantially dehydrate the ACH, typically from about 30 minutes to 4 hours, and more typically for about 2 hours. During calcination 22 a significant portion of the ACH crystalline product 21 is thermally decomposed into active aluminous material and a hydrochloric acid-water vapor stream, according to the following reaction:

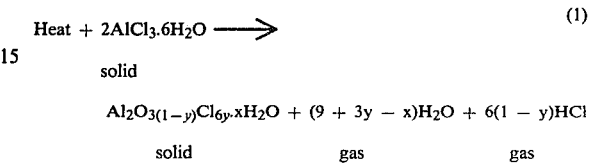

(1)

The liberated HCl is advantageously recovered for reuse in the leaching process.

In general the ACH is heated for a time and at a temperature sufficient to reduce the residual hydrogen content, i.e., the x in equation (1), of the calcined ACH to below about 0.45 percent hydrogen, and preferably below about 0.3 percent, while maintaining as high a level as possible of residual chloride in the solid product, i.e., y should approach or exceed 0.05 in equation (1). In other words, the single stage crystallized ACH is dehydrated using a rotary kiln, a fluidized bed or flash calciner at a temperature to reduce the residual hydrogen levels to an acceptable value, to maintain the highest residual chloride and to produce a highly active product for the subsequent chlorination. The necessity for low residual hydrogen content is to minimize the loss of chlorine to hydrogen chloride, during the chlorination stage, viz:

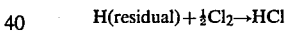

It may be calculated from the combining ratios of hydrogen and chlorine that for every 1 kg of combined residual hydrogen as much as 35 kg of chlorine will be converted to hydrogen chloride. Accordingly, the levels of hydrogen in the calcined product are crucial in dictating the economic viability of the process. The desire to have high residual chloride is to reduce the consumption of valuable chlorine in the subsequent chlorination step. Both factors combined to make the recycle of chlorine from the electrolysis cell more efficient. The dehydration steo of ACH, therefore, will remove the major portion of water and HCl from the ACH producing what is believed to be a basic aluminum chloride compound (a mixture of alumina and hydrated aluminum chlorides), as shown in equation (1). The HCl is recycled to the leach step in the first process step.

U.S. Pat. No. 4,264,569 describes low temperature thermal decomposition of ACH at a temperature range of 200°–450° C. However, it has now been discovered that the residual hydrogen level in calcined ACH does not decrease to an acceptable level, i.e., to less than about 0.45 percent and preferably less than about 0.3 percent hydrogen until the calcination temperature is above 600° C. At temperatures below 450° C. the residual hydrogen is in the range of 0.46 to over 2.0 percent. The residual hydrogen level in calcined ACH appears to be a function of calcination temperature. To produce acceptable feed material for the subsequent chlorination stage an ACH calcination temperature of greater than 450° C. and preferably 600° C. or greater should be used.

Additionally, although the level of chloride decreases with increasing calcination temperatures, as expected, it has also been found that there is only gradual decrease in residual chlorides in the temperature range from 450° to 750° C. and that above about 750° C. the chloride levels drop sharply to a lower level in the temperature range from 800° to 1000° C. Indeed, by calculating the molar ratio of residual chloride to residual hydrogen, it has been found that there is an optimum temperature range for the calcination of 500° to 800° C., preferably between 600° to 750° C. and more specifically, 650° to 750° C., where the molar ratio of Cl/H approaches one. Accordingly, the prior art process as taught in U.S. Pat. No. 4,264,569 can be improved upon by conducting the calcination in the temperature range of the present invention. These calcination temperature ranges, thus, optimize the product in regard to the chlorine utilization in the subsequent chlorination process step.

The ACH crystal product may be fed to a multiple-hearth furnace for calcination, in which case it passes through the furnace countercurrent to the upward gas flow. The aluminum chloride crystals are fed to the top hearths of the furnaces and fall slowly from hearth to hearth, being simultaneously dried and decomposed. During operation, the center shaft rotates slowly and the material on each hearth is raked to a discharge point. The alumina discharged from the furnaces is cooled and transferred to the final product storage binds.

Alternatively, ACH crystals can be heated in a two-stage decomposer/calciner. The decomposer is an indirectly heated, fluidized-bed reactor operating at 200° to 400° C. The indirect-fired decomposer off-gases are cleaned, cooled, and sent to acid recovery. Approximately 25 percent of this cooled gas is recycled to the decomposer by a blower which maintains fluidization of the ACH bed. The calciner is a direct-fired, fluidized-bed reactor or multiple-hearth roaster that operates between 450° and 1000° C. About 90 percent of the ACH decomposition occurs in the decomposer; the remaining decomposition occurs in the calciner. The gas streams from both are then sent to the acid-recovery area.

As a third alternative, ACH may be calcined in an indirectly heated flash calciner or rotary kiln. The purpose of the ACH decomposition process is to decompose and cool the alumina, as well as permit efficient HCl gas-handling and recycling.

Following the thermal decomposition of ACH, according to the present invention, the product is subjected to a reductive chlorination to produce the desired anhydrous aluminum chloride according to the following general equation:

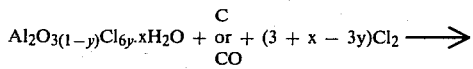
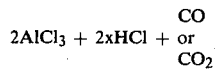

(2)

The reductant (C or CO), oxygen ($O_{3(1-y)}$, xO) and carbon oxides (CO, $CO_2$) balance in the above equation as a function of temperature, and accordingly are not balanced. However, it is clear from the above equation that the total required chlorine for the reductive chlorination of calcined ACH is dependent on the residual hydrogen, 2x, and residual chloride 6y. Thus, when x approaches zero, the total chlorine required to be recycled from the electrolysis cell will be lowered by the residual chloride in the calcined ACH, 6y. The HCl 26 produced from the reductive chlorination is typically processed to recover the chlorine value by known processes, such as the Kel-Chlor process. The chlorine 27 recovered is then combined with chlorine 31 from the electrolysis cell for recycle to the chlorinator. The dehydrated or partially calcined ACH 23 is reductively chlorinated in a reactor 24 by reaction with chlorine gas as the chlorinating agent in the presence of one or more reductants.

In general, the partially calcined ACH prepared according to the present invention is sufficiently activated to enable chlorination to be effected in the presence of virtually any reductant known in the art to be useful for reductive chlorination. Reductants useful in the chlorination of dehydrated ACH calcined according to the present invention include gaseous reducing agents, such as carbon monoxide and producer gas, i.e., mixtures of carbon monoxide, carbon dioxide, and hydrogen, as taught by U.S. Pat. No. 4,264,569; $COCl_2$, $CCl_4$ or mixtures thereof; and/or solid reductants, such as partially calcined green coke according to the teaching of U.S. Pat. No. 4,284,607, activated carbon derived from coal according to the teaching of U.S. Pat. No. 4,105,752; activated fully calcined coke; or even fully calcined coke. Even though it has heretofore been well known to those skilled in the art that using fully calcined coke for reductive chlorination of aluminous material results in a poor chlorination rate, particularly at low chlorination temperatures (Landsberg, "Chlorination Kinetics of Aluminum Bearing Materials", Met. Trans. B. AIME 6B June 1975, p. 207), it has been found that it can be used, provided it is combined with ACH calcined according to the present invention. Each reductant offers advantages and also some disadvantages; thus the selection of the specific reductant will depend on the desired overall process circumstances. Combining calcined ACH according to the herein described method with a reductant will improve the relative chlorination rate when compared to utilizing the same reductant with Bayer alumina feed (fully calcined or partially calcined).

Chlorination in the present invention may be carried out at pressures ranging from about 0.1 atm to about 15 atm, preferably from about 1 atm to about 5 atm and at temperatures from about 500° C. to about 950° C., preferably 550° C. to about 750° C. As will be known and understood by those skilled in the art, it is preferable from an energy savings point of view to effect chlorination at lower temperatures when possible, the temperature being determined by the level of activation of the material to be chlorinated.

In the calcination temperature range of 600° to 750° C., the highest chlorination rates occur corresponding to lower residual hydrogen and higher residual chloride. As calcination temperature is lowered from 600° C., the chlorination rate decreases due to the increased residual hydrogen level in the calcined product. At calcining temperatures above 800° C., the chlorination rate also decreases, but this rate decrease is due to deactivation of the calcined feed.

It can be shown that if chlorination is conducted above 650° C., phosphorous trichloride ($PCl_3$) gas will form, which can be easily separated from the $AlCl_3$ upon condensation of the $AlCl_3$. If chlorination is conducted below 650° C., aluminum phosphate ($AlPO_4$) will form, which is a solid and will remain behind when the $AlCl_3$ gas exits the reaction zone. MgO and $Cr_2O_3$ levels in the single stage crystallized ACH will not cause any deleterious results in the final $AlCl_3$, as the chlorides of these materials have a large difference in boiling points and vapor pressures relative to the $AlCl_3$ and are, therefore, easily separated. Although the single stage crystallized ACH contains minor amounts of sodium (which as hereinbefore mentioned is deleterious in the case of Bayer alumina which typically contains about 0.5 percent), such minor amounts of sodium in the ACH are not problematic to practice of the present invention.

All the oxide impurities in the alumina, whether obtained from calcined single stage crystallized ACH or Bayer alumina, will chlorinate during the reductive chlorination step to produce the respective chloride (except for the phosphorous oxide as mentioned above). At chlorination temperatures below about 650° C., $Na_2O$ and $K_2O$ will be chlorinated, producing $NaAlCl_4$, $Na_3AlCl_6$ and $KAlCl_4$, $K_3AlCl_6$, correspondingly. Based on the impurity levels in the single stage crystallized ACH and Bayer alumina, the total chlorine loss to the impurities was calculated and is shown in Table B.

TABLE B

| Chlorine Loss To Impurities (lb/$Cl_2$/lb Al Produced) In Single Stage Crystalized ACH vs Bayer Alumina | | |
|---|---|---|
| Alumina Feed Type | Chlorination at or below 650° C. | Chlorination above 650° C. |
| Single Stage Crystallized ACH | 0.0034 | .004 |
| Bayer Alumina | 0.037 | .037 |

It can be seen from Table B that, surprisingly, there is a factor of about ten decrease in chlorine loss during the chlorination step using single stage crystallized ACH as a feed material, even though it is considered an impure feed unacceptable to produce feed material for the Hall cell.

The anhydrous $AlCl_3$ 25 produced from the reductive chlorination of calcined ACH 22, according to the method described hereinabove, can be electrolyzed to produce aluminum metal 30 and chlorine for recycle to the chlorinator. The electrolysis can be conducted in a standard closed monopolar electrolytic cell, such as those used to produce magnesium metal, or in bipolar cells, such as those described by Haupin (U.S. Pat. No. 3,755,099), and by Ishikawa et al. (U.S. Pat. No. 4,135,994 and U.S. Pat. No. 4,151,061).

Anhydrous aluminum chloride is dissolved in a molten salt electrolyte consisting of mixed chloride salts of the alkali and alkaline earth metals. Typically, the electrolyte consists of 2 to 15 percent $AlCl_3$, 15 to 17 percent $CaCl_2$ and/or $MgCl_2$ and 15 to 83 percent NaCl and/or LiCl. The cell typically operates at about 700° C. at 0.5 to 1.0 amp/$cm^2$ current density with electrode spacing of about 1.5 cm. At the cathode, aluminum is deposited and it is siphoned out of the cell for casting. At the non-consumable carbon anode, the chlorine 31 is discharged and it is collected with cell off-gases. Cell off-gases are cooled in condenser 34 to condense entrapped metal chlorides before chlorine 31 is combined with recovered chlorine 27 from Kel-Chlor type process for recycle to the chlorinator 24. The condensed chlorides 33 are typically returned to cell 32 less any amounts of salts which are normally introduced with $AlCl_3$ feed. The 35 excess halide salts are bled off.

The improvements in this electrolysis process, as a result of starting with ACH calcined according to the presently described method, are:

(a) The low sodium levels in the ACH (Table A) will result in a low sodium contamination in the anhydrous $AlCl_3$ feed 25 to cell 32, and thus less bleed-off 35 of expensive halide salts with minimum electrolyte composition changes. The latter results in high current efficiency operation and consequently lower power consumption.

(b) More importantly, the material balance in terms of expensive chlorine is much more favorable because of recycle from the cell when using $AlCl_3$ derived from ACH, than when starting with Bayer alumina feed.

Typically, a metal grade alumina from the Bayer process will contain an equivalent of 0.22 weight percent hydrogen, corresponding to x of 0.11 in equation (2) (See U.S. Pat. No. 4,235,860), with no significant amount of residual chloride, corresponding to y of 0.0 in equation (2). In a reductive chlorination, the residual hydrogen in the Bayer alumina leads to a chlorine equivalent, consumed unproductively forming HCl, of 0.16 lb $Cl_2$/lb of Al metal produced. However, almost 90 percent of the chlorine in the HCl can be recovered in a Kel-Chlor type process. The total chlorine loss, therefore, is equivalent to the unrecovered $Cl_2$ from the HCl and the chlorine lost to metal chloride impurities (See Table B) minus the residual chloride in the feed material. This can be expressed in terms of lb $Cl_2$/lb Al metal produced as chlorine make-up in lb $Cl_2$/lb Al$=0.142 \times -0.06y+$CLLI, where x and y are those given by equation (2) and CLLI is the chloride lost to impurities (such as those shown in Table B). Thus, for a typical Bayer alumina feed, a chlorine make-up of 0.053 lb $Cl_2$/lb Al will be required. However, using ACH calcined according to the present invention as the feed material with a typical residual hydrogen of 0.24 weight percent, (corresponding to x of 0.12), a typical residual chloride of 6 weight percent (corresponding to y of 2 in equation (2) and CCLI as shown in Table B for the ACH, the chlorine make-up is calculated to be about $-0.1$ lb $Cl_2$/lb Al, i.e., excess chlorine will be produced. This allows for more efficient and less stringent combined recycle of chlorine from the electrolysis cell 32 and from the Kel-Chlor type recovery system 27 to the chlorinator 24.

The following examples are offered by way of illustration and not by way of limitation.

EXAMPLE 1

100 grams of single stage crystallized ACH was calcined in a rotary kiln using air as a carrier gas. The calcination temperature varied between 400° C. and 1000° C. The off-gases, water and HCl were scrubbed. Each experiment ran for a 2 hour calcination period at each temperature. In addition alumina trihydrate ($Al_2O_3$ $3H_2O$) was partially calcined over the same temperature range following this procedure.

The ACH used in each of the above experiments contained the following impurities:

| Impurities | Amount (Weight Percent in $Al_2O_3$) |
|---|---|
| $P_2O_5$ | .01 |
| MgO | .015 |
| $Cr_2O_3$ | .003 |
| MnO | .002 |
| $V_2O_5$ | <.001 |
| $TiO_2$ | <.001 |
| $K_2O$ | .005 |
| NiO | <.001 |
| CoO | .002 |
| $Fe_2O_3$ | <.005 |
| ZnO | .005 |
| CaO | .03 |
| $Na_2O$ | .01 |

The residual hydrogen and residual chloride levels as measured are shown in Table 1.

TABLE 1

| Sample | Calcination Temp °C. | Residual Hydrogen (wt %) | Residual Chloride (wt %) | Ratio of Cl/H |
|---|---|---|---|---|
| A | 400 | 0.68 | 7.5 | .31 |
| A' | | 1.10 | 0 | 0 |
| B | 450 | 0.48 | — | — |
| C | 500 | 0.33 | 7.1 | 0.6 |
| C' | | 0.70 | 0 | 0 |
| D | 550 | 0.34 | — | — |
| E | 600 | 0.3 | 7.0 | 0.66 |
| E' | | 0.54 | 0 | 0 |
| F | 650 | 0.26 | — | — |
| F' | | 0.56 | 0 | 0 |
| G | 700 | 0.24 | 6.7 | 0.79 |
| H | 750 | 0.24 | — | — |
| I | 800 | 0.26 | 3.0 | 0.33 |
| I' | | 0.34 | 0 | 0 |
| J | 900 | 0.21 | 2.1 | 0.28 |
| J' | | 0.34 (0.42) | — | — |
| K' | | 0.13 | 0 | 0 |

Samples A–J are ACH while samples A', C', E', F', I', J' and K' are $Al_2O_3 \cdot 3H_2O$.

Table 1 shows the residual hydrogen level in calcined ACH as a function of calcination temperature. It is clear from the results presented in Table 1 that to produce an acceptable feed material for the subsequent chlorination stage, i.e. dehydrated ACH with less than about 0.45% hydrogen, an ACH calcination temperature of greater than 450° C. should be used and that to obtain calcined ACH with less than 0.3% residual hydrogen at temperature of greater than about 600° C. is needed.

In addition, examination of the data shows that partially calcined Bayer alumina trihydrate has higher residual hydrogen than partially calcined ACH, particularly in the temperature range below 800° C., where high activity with respect to chlorination is expected to be obtained.

EXAMPLE 2

Example 2 shows that there is no difference between the results of the calcination run in a rotary kiln with either air or nitrogen as the carrier gas.

100 grams of ACH crystals were calcined in a rotary kiln for 2 hours with nitrogen as the fluidizing gas. The results of residual hydrogen for calcining at 400° C. were 0.76 weight percent. The results for 650° C. were 0.27 weight percent. These numbers are comparable to the results obtained in Example 1 wherein a rotary kiln with air as the carrier gas was used.

EXAMPLE 3

Specimens, A, D, and J of Table 1 were chlorinated as follows: A 2 gram sample of calcined ACH was chlorinated in a tube furnace using carbon monoxide as a reductant and chlorine gas as the chlorinating agent. The results of chlorination rate of the calcined ACH as a function of temperature are shown in Table 2.

In addition, Bayer alumina, partially calcined at 1000° C. and fully calcined, i.e., cell or metal grade Bayer alumina, were also chlorinated by the above procedure with the results shown in Table 2.

TABLE 2

| Sample | Chlorination Time, Min | Relative Rate of $AlCl_3$ Produced (g/min) | Average |
|---|---|---|---|
| A | 20 | .051 | |
| (400° C.) | 45 | .048 | |
| | 60 | .051 | |
| | 75 | .048 | .049 |
| D | 20 | .044 | |
| (650° C.) | 45 | .049 | |
| | 60 | .053 | |
| | 75 | .044 | .048 |
| J | 20 | .026 | |
| (1000° C.) | 45 | .026 | |
| | 60 | .030 | |
| | 75 | .026 | .027 |
| Partially | 20 | .005 | |
| Calcined Bayer | 45 | .023 | |
| Alumina/1000 | 60 | .022 | 0.017 |
| Fully Calcined | 20 | .0007 | |
| Bayer Alumina | 45 | .0064 | |
| (cell or metal | 75 | .0045 | 0.0039 |
| grade) | | | |

As can be seen from the data in Table 2, increasing the calcination temperature of the ACH from 400° C. to 650° C. according to the present invention does not adversely affect the activity of the ACH to chlorination to a significant extent, if at all, as evidenced by the substantially equal chlorination rates measured. Moreover from Table 1 it can be seen that calcining in the temperature range between 550° C. and 800° C., and preferably 650° C.–750° C., will result in a highly active product that has the minimum hydrogen and maximum chlorine for efficient reductive chlorination to $AlCl_3$.

The data also demonstrates that using ACH calcined at 400° C., according to the teachings of U.S. Pat. No. 4,264,569, results in highly active product resulting in a rapid chlorination rate. However, as mentioned hereinbefore, this active product also has unacceptably high residual hydrogen. However, calcining ACH to 650° C., produces ACH with low residual hydrogen and maximum residual chlorine while not significantly altering the activity of the product for chlorination.

Calcining ACH at high temperature (1000° C.) reduces the activity of the product for chlorination. Nevertheless, the chlorination rate of calcined ACH at 1000° C. is still higher than partially calcined feed material (trihydrate, $Al_2O_3 \cdot 3H_2O$) from Bayer process. Finally, metal grade alumina (ordinarily used as Hall cell feed and which is the known feed used by others to make $AlCl_3$) has acceptably low residual hydrogen levels, but results in very low chlorination rates compared to ACH primarily because of low particle activity arising from the high calcination temperature (>1000° C.) necessarily used in producing metal grade alumina.

EXAMPLE 4

Further experimentation was carried out in a fluidized-bed reactor for reductive chlorination of ACH (15 grams) calcined at 400° C. and 700° C. The reductant used was CO and the chlorination temperature was 550° C. The results of chlorination measured by the amount of aluminum chloride produced per unit time are provided.

The relative rate of $AlCl_3$ production in a fluidized bed, not surprisingly, will exceed the rate achieved in the tube furnace due to the improved gas-solid contact in the fluidized bed.

TABLE 3

| Time (min) | RATE OF $AlCl_3$ PRODUCED | |
|---|---|---|
| | g/min at 400° C. | g/min at 700° C. |
| 0–30 | .07 | .08 |
| 30–60 | .087 | .095 |
| 60–90 | .07* | .096 |

*suspected leak in reactor - results by extrapolation expected to be about .088 to about .093.

The results show that chlorination rate is higher for 700° C. calcined ACH than for 400° C. calcined ACH. As such calcining ACH to the preferred temperature range of Table 1 above for optimum hydrogen and residual chlorine does not deactivate the ACH particle for rapid chlorination. The fact that the chlorination rate is greater for the 700° C. calcination than for 400° C. is best explained as being due to the higher level of residual hydrogen remaining in the 400° C. calcined ACH of the prior art. The residual hydrogen in ACH, as seen in Table 1, not only results in a process which would be unecomonical due to chlorine loss, but the residual hydrogen also affects the chlorination rate.

EXAMPLE 5

Single crystallized ACH from an HCl leach of kaolin clay from mining operations in east central Georgia was calcined in a rotary kiln at temperatures ranging from 400° C. to 750° C. for two hours and was chlorinated in a 1″ fluidized bed reactor at 550° C. to 800° C. for 60 minutes using chlorine gas as the chlorinating agent and solid particles of fully calcined petroleum coke as the reductant. Metal grade alumina was chlorinated by the same procedure. The results obtained during chlorination in grams of $AlCl_3$ produced per unit time are provided in Table 4.

TABLE 4

| Sample* | Chlorination Temp. °C. | Chlorination Rate Rate g $AlCl_3$/Min |
|---|---|---|
| A | 550 | 0.039 |
| A′ | | 0.0 |
| B | 600 | 0.059 |
| B′ | | 0.015 |
| C | 650 | 0.045 |
| C′ | | 0.012 |
| D | 700 | 0.055 |
| D′ | | 0.025 |
| E | 750 | 0.070 |
| E′ | | — |
| F | 800 | 0.081 |
| F′ | | 0.05 |

*Samples A–F are ACH, while Samples A′–F′ are metal grade alumina (MGA) from Bayer processing.

The data demonstrates that ACH calcined at temperatures of the present invention are sufficiently activated to enable the use of a solid reductant for subsequent chlorination and at improved rates over use of such reductants with metal grade alumina.

Although the foregoing invention has been described in some detail by way of illustration and example for purposes of clarity and understanding, it will be obvious that certain changes and modifications may be practiced with the scope of the invention, as limited only by the scope of the appended claims.

What is claimed is:

1. In a method for producing aluminum by electrolysis of anhydrous aluminum chloride, the improvement comprising substantially dehydrating $AlCl_3.6H_2O$, aluminum chloride hexahydrate (ACH), by heating at a temperature greater than 450° C. to produce a hydrogen- and chloride-containing active aluminous material, said hydrogen present in an amount of less than about 0.45 weight percent hydrogen and thereafter reductively chlorinating said material in the presence of a reducing agent and chlorine gas to produce anhydrous aluminum chloride.

2. The improvement according to claim 1 wherein said heating is at a temperature of from about 500° C. to about 800° C.

3. The improvement according to claim 2 wherein said heating is at a temperature of from about 600° C. to about 750° C.

4. The improvement according to claim 1 wherein said electrolysis is carried out in a bipolar cell wherein chlorine gas is liberated.

5. The improvement according to claim 4, further comprising using said liberated chlorine gas in the reductive chlorination of said hydrogen- and chlorine-containing active aluminous material.

6. The improvement according to claim 1, further comprising preparation of said aluminum chloride hexahydrate by leaching aluminous material.

7. The improvement of claim 6 wherein said material is a clay and said leaching comprises hydrochloric acid leaching.

8. The improvement of claim 7 wherein said hydrochloric acid leaching comprises the steps of:
   (a) drying and calcining said clay to activate the alumina fraction thereof;
   (b) leaching said clay with hydrochloric acid leach solution to dissolve said alumina fraction into soluble aluminum chloride;
   (c) effecting a liquid/solid separation on said leach solution to yield an alumina fraction containing pregnant process liquor; and
   (d) crystallizing ACH crystals from the hydrochloric acid containing liquor.

9. The improvement according to claim 8 further comprising recycling said hydrochloric acid containing liquor for use in said leaching.

10. The improvement according to claim 1 wherein said ACH is single stage crystallized ACH.

11. A method of producing aluminum from aluminous material comprising:
   (a) acid leaching said aluminous material in HCL acid leach liquor;
   (b) crystallizing ACH crystals from said liquor;
   (c) Partially calcining said ACH crystals by heating at a temperature for a time sufficient to substantially dehydrate said crystals to produce a hydrogen and chlorine-containing partially calcined ACH product (PCACH), said hydrogen present in an amount less than about 0.45 weight percent;

(d) reductively chlorinating said PCACH in the presence of a chlorinating agent and a reducing agent to produce $AlCl_3$; and (e) electrolyzing said $AlCl_3$ to produce aluminum metal and chlorine gas.

12. A method according to claim 11 wherein the crystallization comprises HCl gas sparging.

13. A method according to claim 11 wherein said partial calcining is at a temperature of from about 500° C. to about 800° C.

14. A method according to claim 13 wherein said temperature is from about 600° C. to about 750° C.

15. A method according to claim 14 wherein the hydrogen of said PCACH is less than about 0.3 percent.

16. A method according to claim 11 comprising calcining said aluminous material prior to said acid leaching.

17. A method according to claim 16 wherein said aluminous material is kaolin clay.

18. A method according to claim 11 wherein said reducing agent comprises at least one gaseous reductant.

19. A method according to claim 18 wherein at least one gaseous reductant is carbon monoxide.

20. A method according to claim 11 wherein said reducing agent is solid.

21. A method according to claim 20 wherein said reducing agent is selected from the group consisting of partially and fully calcined petroleum coke.

22. A method according to claim 11 wherein said crystallizing of step (b) comprises single stage crystallization.

23. A method according to claim 11 further comprising recycling the chlorine produced in step (c) for use as the chlorinating agent of step (d).

24. A method according to claims 11 and 23 wherein said acid of step (a) is HCl and further comprising recycling the HCl-containing liquor from the crystallization of step (b) for use in the leaching of step (a).

25. A method of producing anhydrous aluminum chloride suitable for electrolytic reduction to aluminum and chlorine comprising heating aluminum chloride hexahydrate crystals to a temperature and for a time sufficient to produce a hydrogen- and chlorine-containing active aluminous material, said hydrogen present in an amount below about 0.45 percent.

26. A method according to claim 25 wherein said time and temperature are sufficient to reduce the hydrogen content to below about 0.3 percent.

27. A method according to claim 25 wherein said temperature is from about 600° C. to about 750° C.

28. A method according to claim 25 wherein said aluminum chloride hexahydrate crystals (ACH) are acid leach derived.

29. A method according to claim 28 wherein said aluminum chloride hexahydrate crystals are single stage crystallized.

* * * * *